(No Model.) 2 Sheets—Sheet 1.
F. BAIN.
OIL FILTER.
No. 569,159. Patented Oct. 13, 1896.
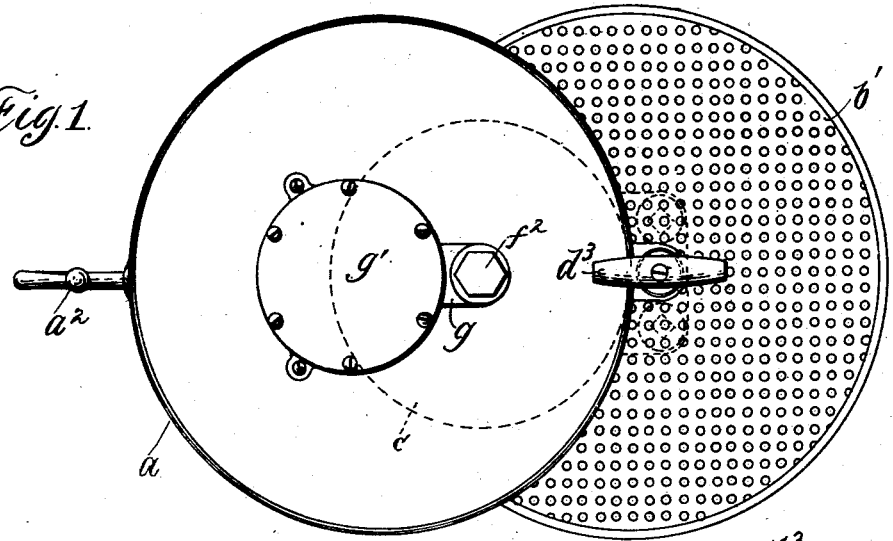
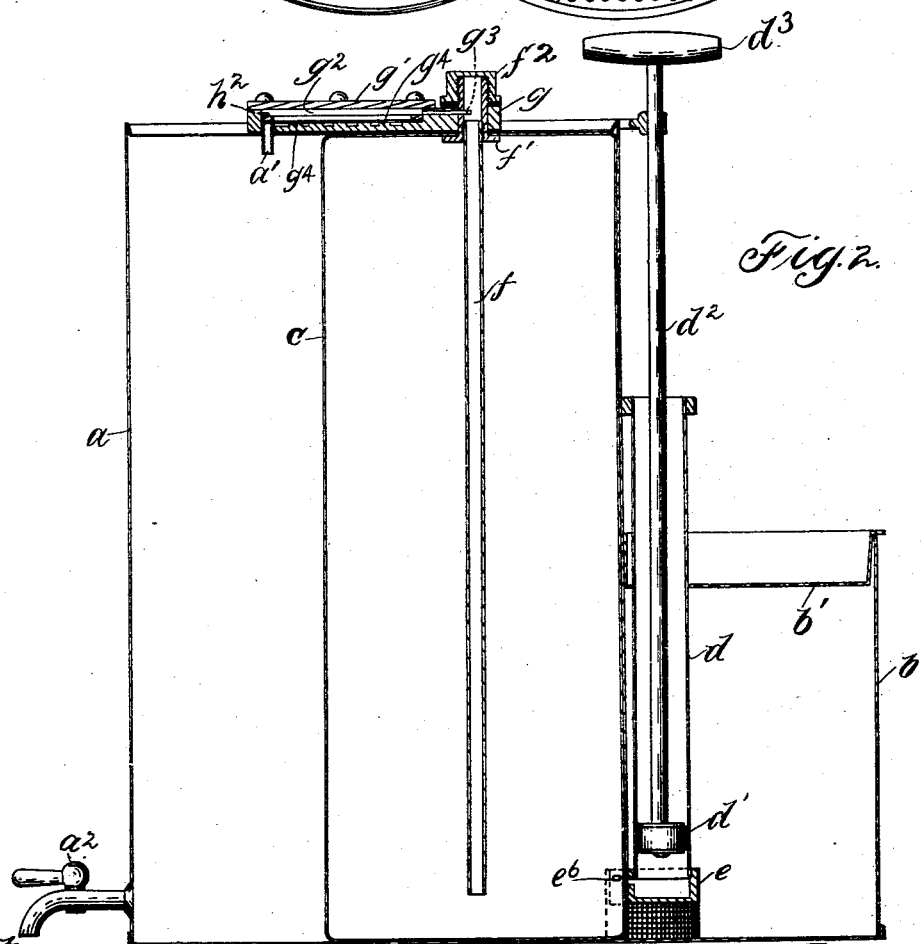
Witnesses:
George L. Cragg.
W. Clyde Jones.
Inventor:
Forée Bain.
By Barton & Brown
Attorneys.

(No Model.) 2 Sheets—Sheet 2.
F. BAIN.
OIL FILTER.
No. 569,159. Patented Oct. 13, 1896.
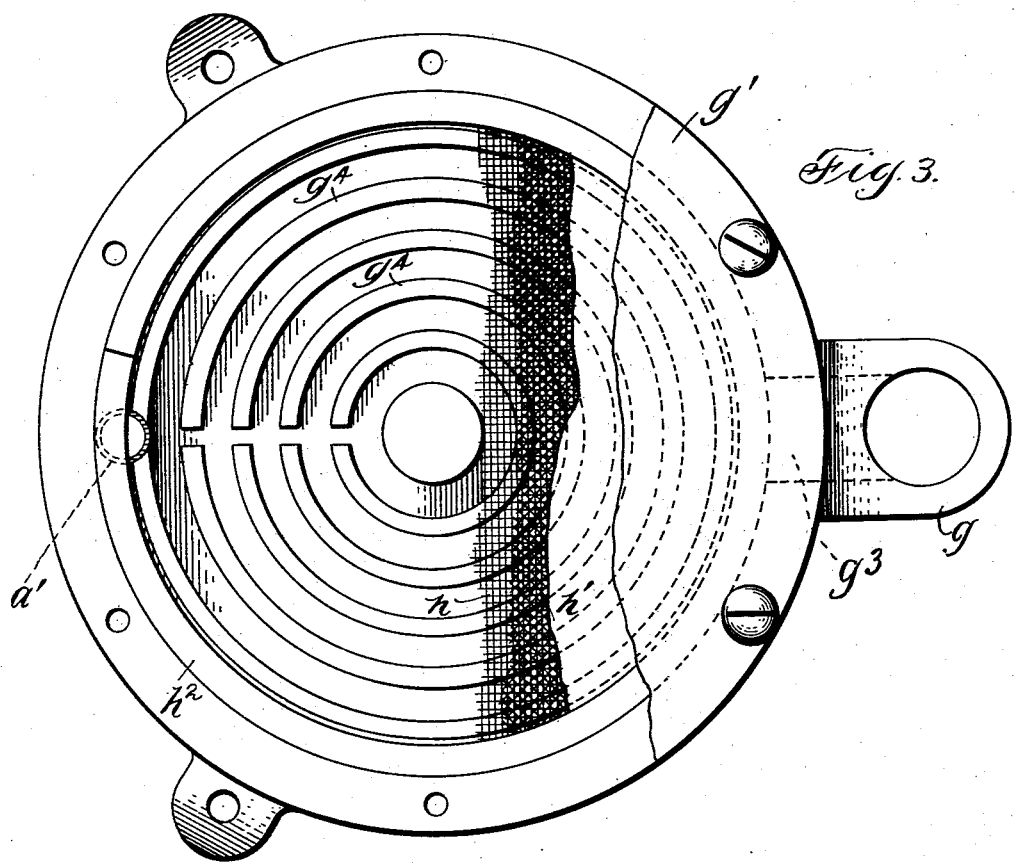
Fig. 3.
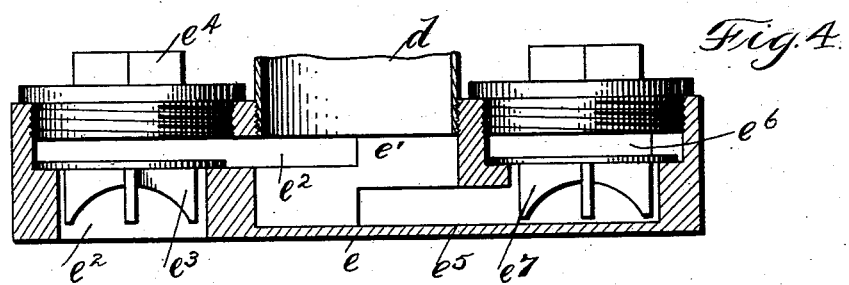
Fig. 4.
Fig. 5.
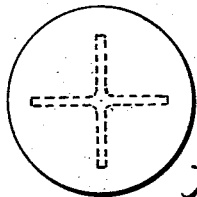
Witnesses:
George L. Cragg.
W. Clyde Jones.
Inventor.
Forée Bain.
By Barton & Brown
Attorneys.

UNITED STATES PATENT OFFICE.

FORÉE BAIN, OF CHICAGO, ILLINOIS.

OIL-FILTER.

SPECIFICATION forming part of Letters Patent No. 569,159, dated October 13, 1896.

Application filed December 18, 1895. Serial No. 572,515. (No model.)

*To all whom it may concern:*

Be it known that I, FORÉE BAIN, a citizen of the United States, residing at Chicago, in the county of Cook and State of Illinois, have invented a certain new and useful Improvement in Oil-Filters, (Case No. 2,) of which the following is a full, clear, concise, and exact description, reference being had to the accompanying drawings, forming a part of this specification.

My invention relates to an oil-filter, its object being to provide a filter whereby the dirt and other material may be effectively removed from the oil.

In oil that has been used for lubricating journal-bearings I have found that there are very small particles of metal worn from the bearings which are suspended in the oil, and by the usual filters, though the dirt may be removed, the particles of metal remain suspended in the oil. The passage of the oil through such filtering materials as water, charcoal, cloths, excelsior, and the like does not break up the drops, and the drops, due to the cohesion of the particles of the oil, inclose the small particles of iron and maintain the same in suspension during the passage of the oil through the filtering materials. I have found that these particles of metal may be effectively removed from the oil by forcing the oil under pressure through a diaphragm or other body of porous material, the material being thus permeable to the oil when finely divided, but the pores being of insufficient size to permit the passage of the particles of metal. The removal of the particles of metal thus held in suspension makes the filtered oil practically as good for lubricating purposes as it was originally, and it is the presence of the small particles of metal in oil as heretofore filtered that has rendered the filtered oil more or less destructive of the bearings. I may employ any porous material for the filtering diaphragm, but preferably employ the ordinary blotting-paper, which makes a very good filtering material and can be had at a minimum cost. The filtering material should be continuous, whereby all of the oil will be forced through the pores of the material, and should not be made up of material laid together in such a manner that the oil may trickle through the filtering material without passing through the pores thereof. After the filtering operation has been continued for some time, the surface of the blotting-paper, when examined under a microscope, displays myriads of finely-divided particles of metal which have been removed from the oil.

In the preferred form of my invention I provide a receiving tank or vessel into which the oil to be filtered may be poured, a perforated cover being preferably provided for the tank, which prevents the entrance of foreign matter, such as waste and the like. A pump is provided for forcing the oil from the receiving-tank into a pressure-tank, the pressure-tank being air-tight, whereby a pressure may be produced in the tank by forcing into the tank a sufficient quantity of oil, or, if there be but a small quantity of oil in the receiving-tank, air may be pumped into the pressure-tank to provide the required degree of pressure. A pipe extends from the pressure-tank to a filtering-receptacle in which is placed the filtering-diaphragm. The oil is thus forced through the diaphragm under pressure and passes to an oil-tank, from which it may be withdrawn for use as desired.

In mechanical construction I preferably form the pressure-tank cylindrical in shape and situate the same within the oil-tank, which is also cylindrical. The receiving-tank, which is more or less of a crescent shape, is mounted upon the side of the oil-tank, while the filtering-receptacle containing the diaphragm is mounted upon the top of the oil-tank, the pump being mounted upon the side of the oil-tank with the handle in a convenient location, whereby it may be readily grasped and manipulated.

I will describe the preferred form of my invention in detail by reference to the accompanying drawings, in which—

Figure 1 is a top view of the oil-filter of my invention. Fig. 2 is a vertical sectional view thereof. Fig. 3 is a view looking upon the top of the filtering-receptacle, the various parts thereof being shown broken away to illustrate the construction and arrangement. Fig. 4 is sectional view of the casting constituting a part of the pump. Fig. 5 is a plan view of one of the valves of the pump.

Like letters refer to like parts in the several figures.

To the side of the oil-tank or receptacle $a$ is mounted the receiving-tank $b$. A pan or cover $b'$ is fitted upon the upper end of the receiving-tank and is provided with a perforated bottom, which permits the passage of the oil while preventing the passage of foreign matter, such as waste and the like. Within the oil-tank $a$ is provided the pressure-tank $c$. Extending into the receiving-tank $b$ is the pump barrel or cylinder $d$, within which moves the pump-piston $d'$, mounted upon a pump-rod $d^2$, carrying a handle $d^3$ at the upper end. The pump-barrel $d$ is screwed into the central opening $e'$ of a casting $e$. (Shown in detail in Fig. 4.) The opening $e'$ communicates with a port or opening $e^2$, communicating with the receiving-tank $b$, a valve $e^3$ normally closing said port $e^2$. Above the port $e^2$ is an opening which is closed by a removable nut $e^4$, the removable nut affording access to the valve $e^3$ for the purpose of repair. The opening $e'$ also communicates with a port $e^5$, which in turn communicates, through a channel $e^6$, with the interior of the pressure-tank. A valve $e^7$ normally closes the port $e^5$. When the piston $d'$ is raised, the valve $e^3$ is lifted and oil is forced through the port $e^2$, through the opening $e'$, to the pump-barrel $d$. When the piston is depressed, the valve $e^3$ is maintained closed while the oil is forced through the port $e^5$, lifting the valve $e^7$, the oil then passing through the opening $e^6$ to the pressure-tank $c$. As the oil rises in the pressure-tank $c$, the air is entrapped above the surface of the oil, and as oil is forced into the pressure-tank the air therein is subjected to pressure. If there be but a small quantity of oil in the receiving-tank after this has been pumped into the pressure-tank, air will be forced into the pressure-tank and the pressure thus increased in the required degree.

A pipe $f$ extends into the pressure-tank and terminates a short distance from the bottom thereof, the upper end of the pipe being screwed or otherwise secured to a shouldered bushing $f'$, which extends through an opening in the upper end of the pressure-tank and also through an opening provided in the plate or casting $g$, containing the filtering-receptacle. A nut or cap $f^2$ screws upon the end of the bushing $f'$ and may be removed when it is desired to clean the pipe $f$ by the insertion of a wire or other object. Upon the interior of the plate or casting $g$ is a cylindrical receptacle inclosed by a plate $g'$, screwed to the top of the casting $g$. The filtering-receptacle $g^2$ thus formed communicates by a passage $g^3$ with the interior of the pipe $f$. Upon the casting $g$ are provided annular ridges $g^4$ $g^4$, grooves being thus formed between the ridges which communicate with a pipe $a'$, extending into the oil-tank $a$. Upon the ridges $g^4$ rests a wire-gauze $h$, and upon this are provided one or more layers $h'$ of filtering material, as felt or blotting-paper, preferably the latter. A ring $h^2$ is adapted to snugly fit the walls of the filtering-receptacle and to press against the edges of the filtering material to prevent the passage of oil around the edges of the filtering material. The oil, due to the pressure of the air within the pressure-tank $c$, is forced through the pipe $f$ and passage $g^3$ into the filtering-receptacle $g^2$ and is forced under pressure through the filtering material and enters the oil-tank $a$ through the pipe $a'$. The oil as thus filtered may be drawn off as desired by means of the valve $a^2$. The plate $g'$ of the filtering-receptacle may be removed when desired to gain access to the interior of the filtering-receptacle, and by the removal of the ring $h^2$ the disks of filtering material may be taken out and replaced.

I have illustrated in the embodiment of my invention above described means for subjecting the oil to pressure by subjecting the oil in a pressure-tank to an increased pressure, but it will be evident that the difference of pressure upon the two sides of the filtering diaphragm may be secured in other ways, all of which I consider to be within the scope of the present invention.

Having described my invention, what I claim as new, and desire to secure by Letters Patent, is—

1. In an oil-filter, the combination with an oil-retaining tank, of a pressure-tank situated within said retaining-tank, a filtering-chamber provided upon the top of said retaining-tank, a pipe or tube extending downward from said filtering-chamber into said pressure-tank nearly to the bottom thereof and communicating with said filtering-chamber, a porous diaphragm or partition provided in said filtering-chamber through which the oil must pass in passing from the pressure-tank to the retaining-tank, a receiving-tank mounted upon the exterior of said retaining-tank, and a pump for forcing oil from the receiving-tank into the pressure-tank; substantially as described.

2. In an oil-filter, the combination with the cylindrical oil-tank $a$, of the cylindrical pressure-tank $c$ situated therein, the crescent-shaped receiving-tank $b$ mounted upon the exterior of said oil-tank $a$, a pump for forcing the oil from said receiving-tank into said pressure-tank, the vertical tube or pipe $f$ extending into the pressure-tank, a removable cap upon the upper end of said tube or pipe, a filtering chamber or receptacle mounted upon the upper end of said oil-tank $a$ and provided with a removable cover, and a porous diaphragm or partition situated within said filtering-receptacle; substantially as described.

In witness whereof I hereunto subscribe my name this 10th day of December, A. D. 1895.

FORÉE BAIN.

Witnesses:
 JOHN W. SINCLAIR,
 W. CLYDE JONES.